(12) United States Patent
Hahn

(10) Patent No.: US 12,279,260 B2
(45) Date of Patent: Apr. 15, 2025

(54) METHOD AND DEVICE FOR APERIODIC DATA TRANSMISSION IN SIDELINK COMMUNICATION

(71) Applicants: Hyundai Motor Company, Seoul (KR); Kia Corporation, Seoul (KR)

(72) Inventor: Gene Back Hahn, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 462 days.

(21) Appl. No.: 17/633,846

(22) PCT Filed: Jun. 15, 2020

(86) PCT No.: PCT/KR2020/007707
§ 371 (c)(1),
(2) Date: Feb. 8, 2022

(87) PCT Pub. No.: WO2021/029530
PCT Pub. Date: Feb. 18, 2021

(65) Prior Publication Data
US 2022/0330304 A1    Oct. 13, 2022

Related U.S. Application Data

(60) Provisional application No. 62/884,889, filed on Aug. 9, 2019.

(51) Int. Cl.
*H04W 72/12*    (2023.01)
*H04W 72/121*    (2023.01)
(Continued)

(52) U.S. Cl.
CPC ......... *H04W 72/20* (2023.01); *H04W 72/121* (2013.01); *H04W 72/23* (2023.01)

(58) Field of Classification Search
CPC ....... H04W 72/12; H04W 4/40; H04W 72/23; H04W 72/20; H04W 92/18; H04W 88/08;
(Continued)

(56) References Cited

U.S. PATENT DOCUMENTS

2018/0302895 A1    10/2018    Akkarakaran et al.
2018/0324768 A1    11/2018    Shaheen et al.
(Continued)

FOREIGN PATENT DOCUMENTS

WO    2016181095 A1    11/2016
WO    2017007184 A1    1/2017

OTHER PUBLICATIONS

ITRI, "R1-1902405 Considering on NR Uu for Resource Configuration on controlling NR sidelink," Feb. 15, 2019, 3GPP TSG RAN WG1 https://www.3gpp.org/ftp/tsg_ran/WG1_RL1/TSGR1_96/Docs (Year: 2019).*

(Continued)

*Primary Examiner* — Gbemileke J Onamuti
(74) *Attorney, Agent, or Firm* — Fox Rothschild LLP

(57) ABSTRACT

A method and a device for aperiodic data transmission in sidelink communication are disclosed. An operating method of a first terminal comprises the steps of: transmitting, to a base station, a request message requesting the allocation of sidelink resources for aperiodic data; receiving, from the base station, first CG configuration information that includes first resource allocation information indicating the sidelink resources; checking the sidelink resources indicated by the first resource allocation information; and, when the aperiodic data is generated, transmitting, to a second terminal, the aperiodic data in a first transmission period comprising the sidelink resources. Therefore, the performance of a communication system can be improved.

20 Claims, 10 Drawing Sheets

(51) Int. Cl.
*H04W 72/14* (2009.01)
*H04W 72/20* (2023.01)
*H04W 72/23* (2023.01)

(58) Field of Classification Search
CPC ....... H04W 4/44; H04W 4/46; H04W 72/121; H04L 5/0095; H04L 5/0053; H04L 5/0098
USPC .......................................................... 370/329
See application file for complete search history.

(56) References Cited

U.S. PATENT DOCUMENTS

| | | | |
|---|---|---|---|
| 2018/0367255 A1 | 12/2018 | Jeon et al. | |
| 2019/0037555 A1 | 1/2019 | Kim et al. | |
| 2020/0037343 A1* | 1/2020 | He | H04W 28/0268 |

OTHER PUBLICATIONS

Oppo "R1-1902389 Discussion on UE autonomous RA in NR-V2X," Feb. 16, 2019, 3GPP TSG RAN WG1 https://www.3gpp.org/ftp/tsg_ran/WG1_RL1/TSGR1_96/Docs (Year: 2019).*

R1-1810870; 3GPP TSG RAN WG1 #94bis Chengdu, China, Oct. 8-12, 2018; Agenda item: 7.2.4.1.4; Source: Samsung; Title:Discussion on Resource Allocation Mechanisms for NR V2X.

R1-1902389; 3GPP TSG0RAN WG1 #96;Athens, Greece 25 Feb.-Mar. 1, 2019; Agenda item: 7.2.4.1.4; Title: Discussion on UE autonomous RA in NR-V2X; Source: OPPO.

R1-1902405; 3GPP TSG RAN WG1 #96; Athens, Greece, 25th Feb.-Mar. 1, 2019; Agenda item:7.2.4.3; Source: ITRI; Title:Considering on NR Uu for Resource Configuration on controlling NR sidelink.

R1-1906650; 3GPP TSG RAN WG1 #97;Reno, USA, May 13-17, 2019; Source: Fraunhofer HHI, Fraunhofer IIS; Title: Resource Allocation for Mode 1 NR V2X; Agenda item: 7.2.4.2.1.

Li, J.L. et al., "A trend analysis of 5G broadcasting technology", Video Engineering, 2019, 43(6):51-57.

Naik, G. et al., "IEEE 802.11bd & 5G NR V2X: Evolution of Radio Access Technologies for V2X Communications", arXiv:1903.08391v2 [cs.IT] Mar. 26, 2019, 12 pages.

"Discussion on resource allocation for mode 2", 3GPP TSG RAN WG1 Meeting #94bis, Chengdu, China, Oct. 8-12, 2018, R1-1811007, Agenda Item 7.2.4.1.4, 4 pages.

"Discussion on resource allocation mechanism for NR V2X", 3GPP TSG RAN WG1 #96, Athens, Greece, Feb.-Mar. 1, 2019, R1-1903337, Agenda Item 7.2.4.1.4, 14 pages.

Status Report to TSG, 3GPP TSG RAN meeting #82, Sorrento, Italy, Dec. 10-13, 2018, RP-182490, Agenda Item 9.3.6, 31 pages.

* cited by examiner

METHOD AND DEVICE FOR APERIODIC DATA TRANSMISSION IN SIDELINK COMMUNICATION

CROSS-REFERENCE TO RELATED APPLICATIONS

This application is a National Phase application filed under 35 USC 371 of PCT International Application No. PCT/KR2020/007707 with an International Filing Date of Jun. 15, 2020, which claims priority from U.S. Provisional Application 62/884,889 filed on Aug. 9, 2019. The entire contents of these applications are incorporated herein by reference in their entirety.

BACKGROUND

(a) Technical Field

The present disclosure relates to a sidelink communication technique, more particularly, to a technique for transmitting and receiving aperiodic data using configured grant (CG) resources.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, the sidelink communication may support an aperiodic service. Data according to the aperiodic service may be transmitted aperiodically using a sidelink channel. However, since the CG resources are periodically configured, aperiodic data in sidelink communication may not be transmitted using the CG resources. Methods for configuring CG resources are needed to solve the above-described problem.

SUMMARY

An objective of the present disclosure for solving the above-described problem is to provide a method and an apparatus for transmitting and receiving aperiodic data by using configured grant (CG) resources in sidelink communication.

An operation method of a first terminal, according to a first exemplary embodiment of the present disclosure for achieving the objective, may comprise: transmitting, to a base station, a request message requesting allocation of sidelink resources for aperiodic data; receiving, from the base station, first CG configuration information including first resource allocation information indicating the sidelink resources; identifying the sidelink resources indicated by the first resource allocation information; and in response to occurrence of the aperiodic data, transmitting the aperiodic data to a second terminal in a first transmission interval composed of the sidelink resources.

The first CG configuration information may be configured independently of second CG configuration information including second resource allocation information for transmission of periodic data.

The request message may include at least one of an indicator requesting allocation of the sidelink resources for the aperiodic data, information indicating a size of the aperiodic data, information on a transmission pattern of the aperiodic data, or combinations thereof.

The operation method may further comprise receiving, from the base station, an activation message indicating activation of the first CG configuration information, wherein when the activation message is received, the sidelink communication using the sidelink resources is performed.

The first resource allocation information may include information on a first transmission periodicity and information on a second transmission periodicity, the first transmission periodicity may be different from the second transmission periodicity, and the sidelink resources may be indicated by a combination of the first transmission periodicity and the second transmission periodicity.

The first resource allocation information may include a bitmap indicating the sidelink resources.

When transmission of the aperiodic data is scheduled by sidelink control information (SCI), the SCI may include at least one of information of a second transmission interval after the first transmission interval, information indicating whether the aperiodic data is transmitted in the second transmission interval, or a combination thereof.

The operation method may further comprise, when the aperiodic data does not exist, transmitting a dummy signal in the first transmission interval.

The operation method may further comprise, when the sidelink communication is performed in a groupcast scheme, the first terminal among terminals participating in groupcast communication may be a groupcast header, and remaining terminals including the second terminal may be groupcast members, configuring groupcast sidelink resources for each of the groupcast members within the sidelink resources indicated by the first resource allocation information; and transmitting information of the groupcast sidelink resources to each of the groupcast members.

An operation method of a base station, according to a second exemplary embodiment of the present disclosure for achieving the objective, may comprise: generating first CG configuration information including first resource allocation information indicating aperiodic sidelink resources for aperiodic data; generating second CG configuration information including second resource allocation information indicating periodic sidelink resources for periodic data; transmitting, to a terminal, a first message including the first CG configuration information and the second CG configuration information; and transmitting, to the terminal, a second message requesting activation of the first CG configuration information.

The first CG configuration information may be generated when a request message requesting allocation of the aperiodic sidelink resources is received from the terminal.

The first resource allocation information may include information on a first transmission periodicity and information on a second transmission periodicity, the first transmission periodicity may be different from the second transmission periodicity, and the aperiodic sidelink resources may be indicated by a combination of the first transmission periodicity and the second transmission periodicity.

The first resource allocation information may include a bitmap indicating the aperiodic sidelink resources.

The first CG configuration information may further include at least one of an information indicator indicating whether sidelink control information (SCI) for scheduling transmission of the aperiodic data includes information of a next transmission period, a dummy indicator indicating whether a dummy signal is transmitted when the aperiodic data does not exist, or a combination thereof.

The first CG configuration information may further include a grant indicator indicating that the terminal is allowed to activate or deactivate the aperiodic sidelink resources without control of the base station.

The first message may be a radio resource control (RRC) message, and the second message may be a physical (PHY) layer message.

A first terminal, according to a third exemplary embodiment of the present disclosure for achieving the objective, may comprise: a processor; and a memory storing one or more instructions executable by the processor, wherein the one or more instructions cause the first terminal to: receive, from a base station, CG configuration information including information of a first transmission periodicity and information of a second transmission periodicity; identify aperiodic sidelink resources indicated by a combination of the first transmission periodicity and the second transmission periodicity; and in response to occurrence of the aperiodic data, transmit the sidelink data to a second terminal in a first transmission period composed of the aperiodic sidelink resources, wherein the first transmission periodicity is different from the second transmission periodicity.

The one or more instructions may further cause the first terminal to transmit a request message requesting allocation of the aperiodic sidelink resources to the base station, and the CG configuration information may be received after transmitting the request message.

The one or more instructions may further cause the first terminal to receive, from the base station, an activation message indicating activation of the CG configuration information, and the sidelink communication using the aperiodic sidelink resources may be performed when the activation message is received.

When transmission of the sidelink data is scheduled by sidelink control information (SCI), the SCI may include at least one of information on a second transmission interval after the first transmission interval, information indicating whether the sidelink data is transmitted in the second transmission interval, or a combination thereof.

When the sidelink data does not exist, the one or more instructions may further cause the first terminal to transmit a dummy signal in the first transmission interval.

According to the present disclosure, CG configuration information may indicate aperiodic sidelink resources. The terminal may transmit aperiodic data using the aperiodic sidelink resources. In this case, a transmission latency of the aperiodic data may be reduced, and wasted sidelink resources may also be reduced. In addition, in groupcast communication, a groupcast header may activate or deactivate aperiodic sidelink resources without control of the base station. In this case, transmission latency and signaling overhead of aperiodic data can be reduced.

DETAILED DESCRIPTION

Figure 1:
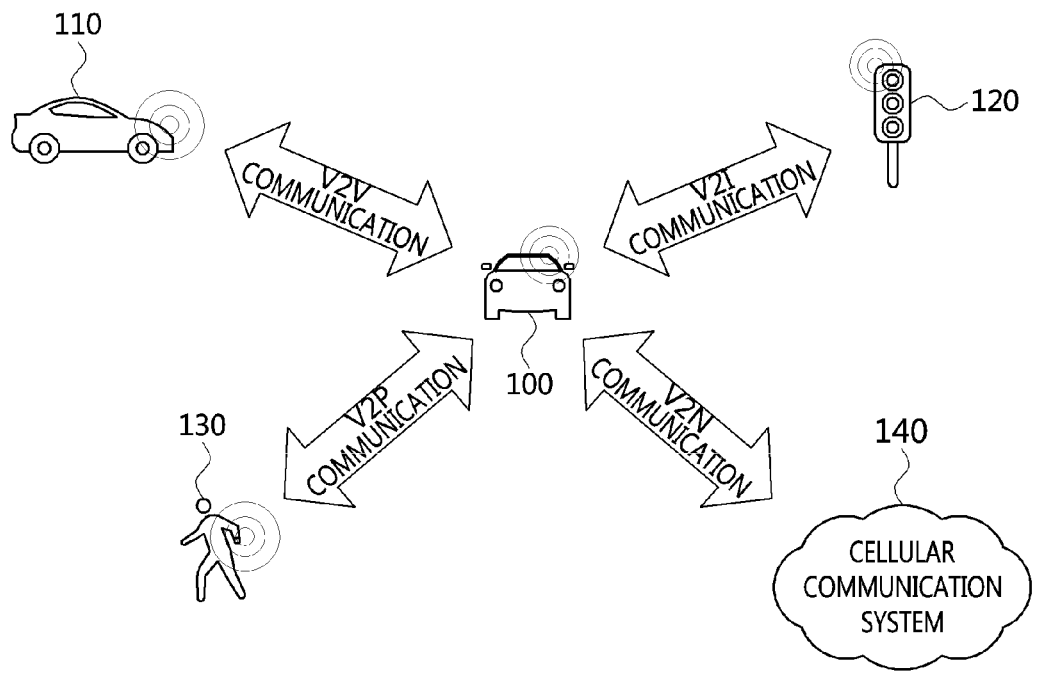
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
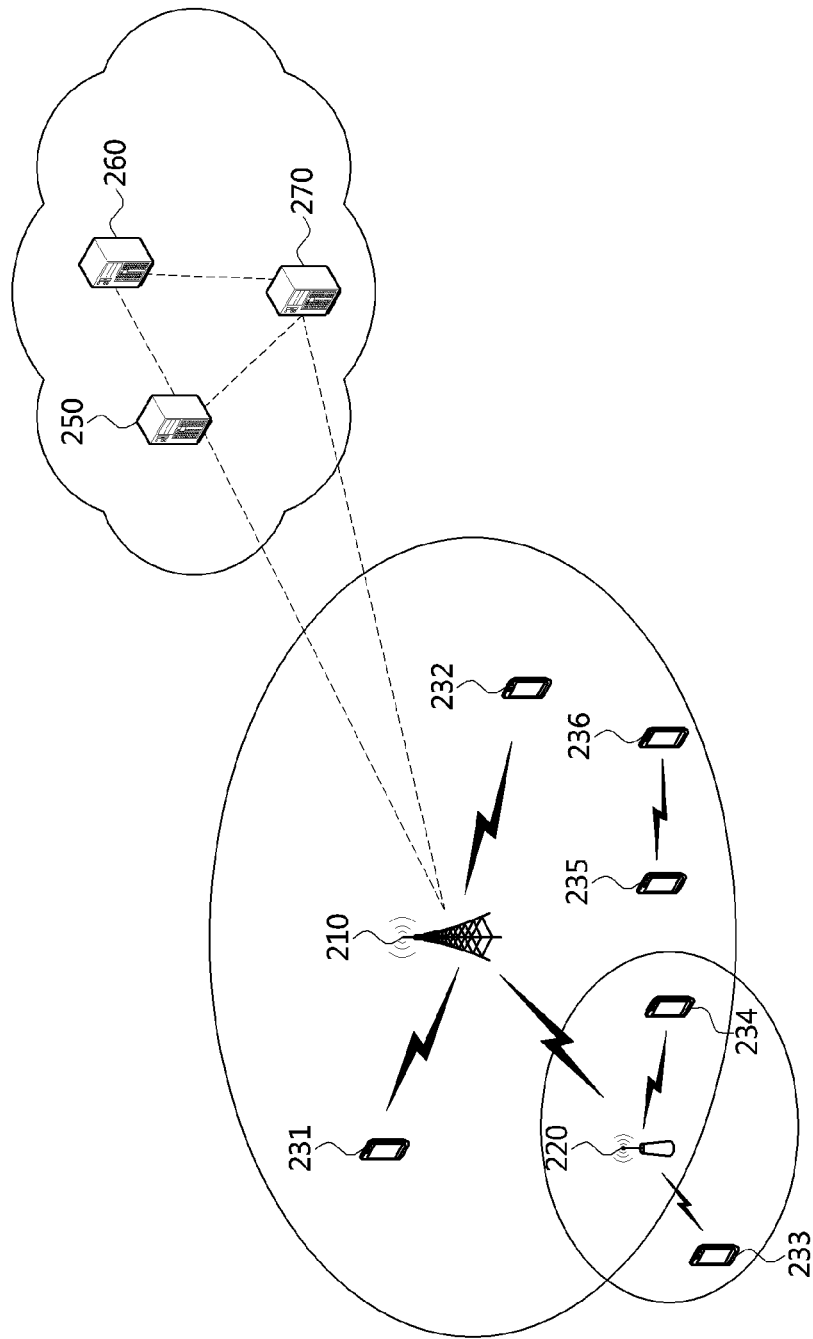
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like.

The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
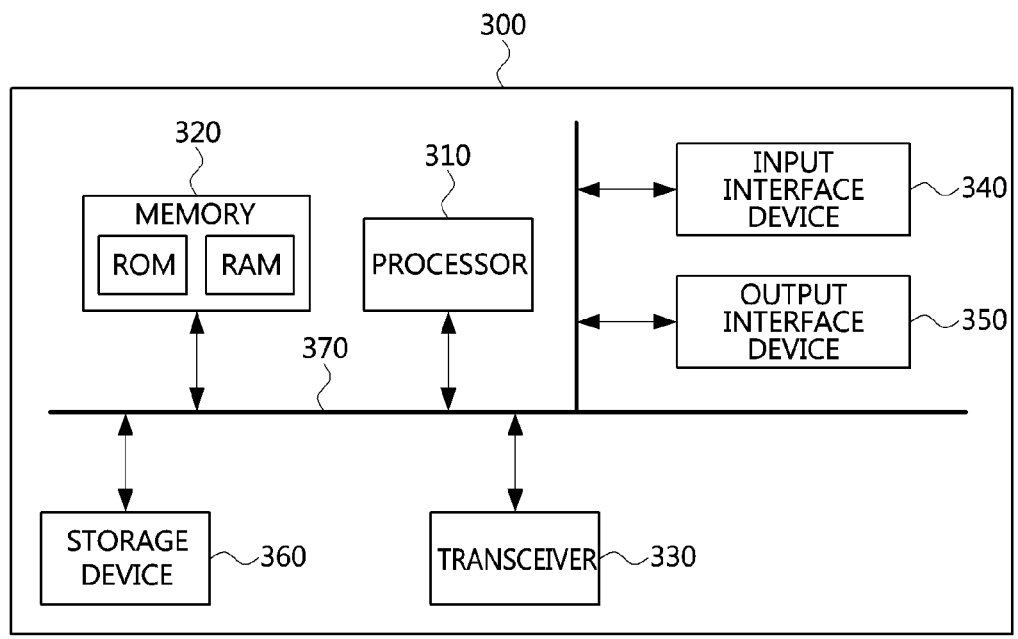
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
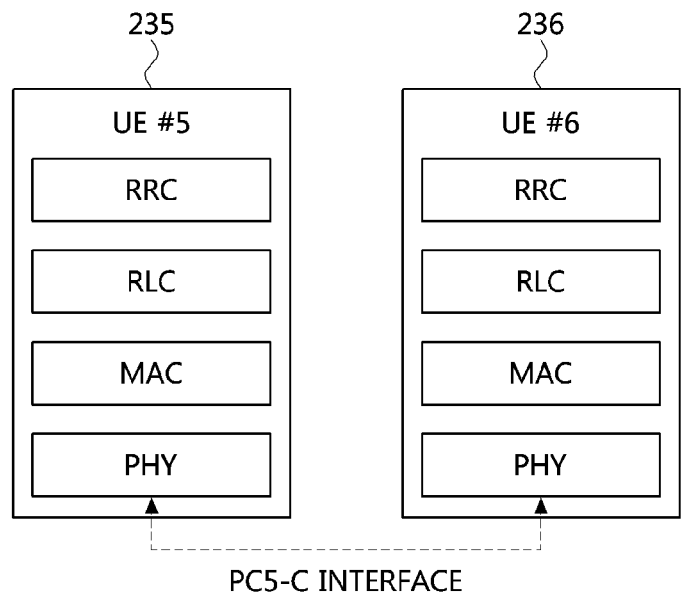
FIG. 5 is a block diagram illustrating a first exemplary embodiment of a control plane protocol stack of a UE performing sidelink communication.
Figure 6:
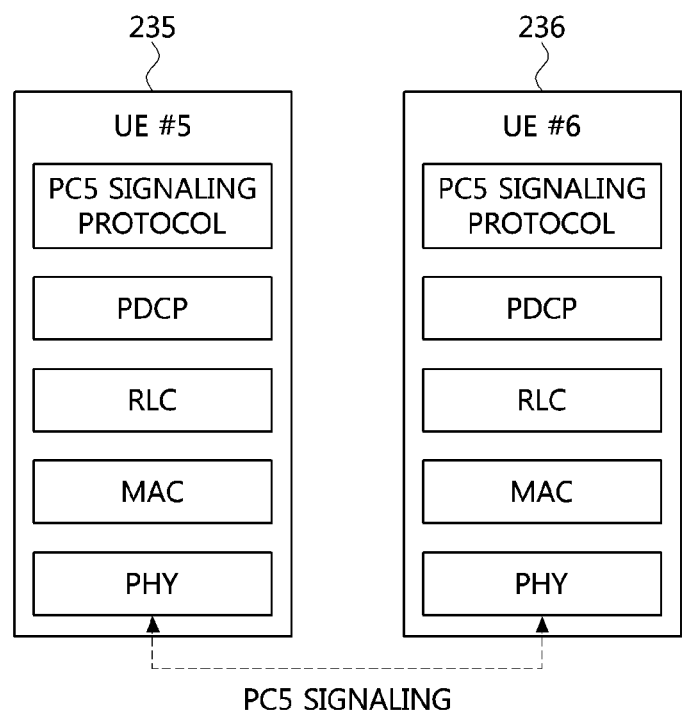
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
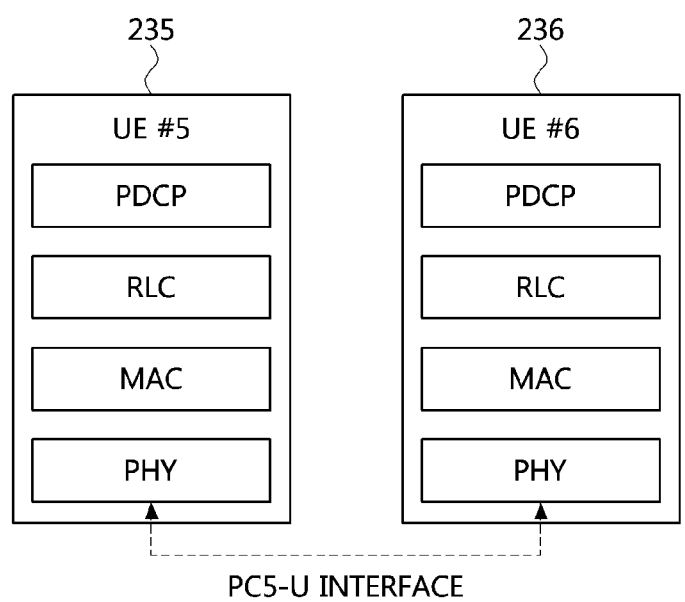
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, data transmission/reception methods using CG resources in sidelink communication will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

Meanwhile, zones for sidelink communication may be configured. A zone may be a geographic zone. Sidelink resources (e.g., resource pool) for each of the zones may be configured. That is, a mapping relationship between zones and sidelink resources may be configured. The base station may configure the zones, and may configure sidelink resources mapped to each of the zones. Alternatively, the zones may be predefined in a technical specification. The zones may be configured as follows.

Figure 7:
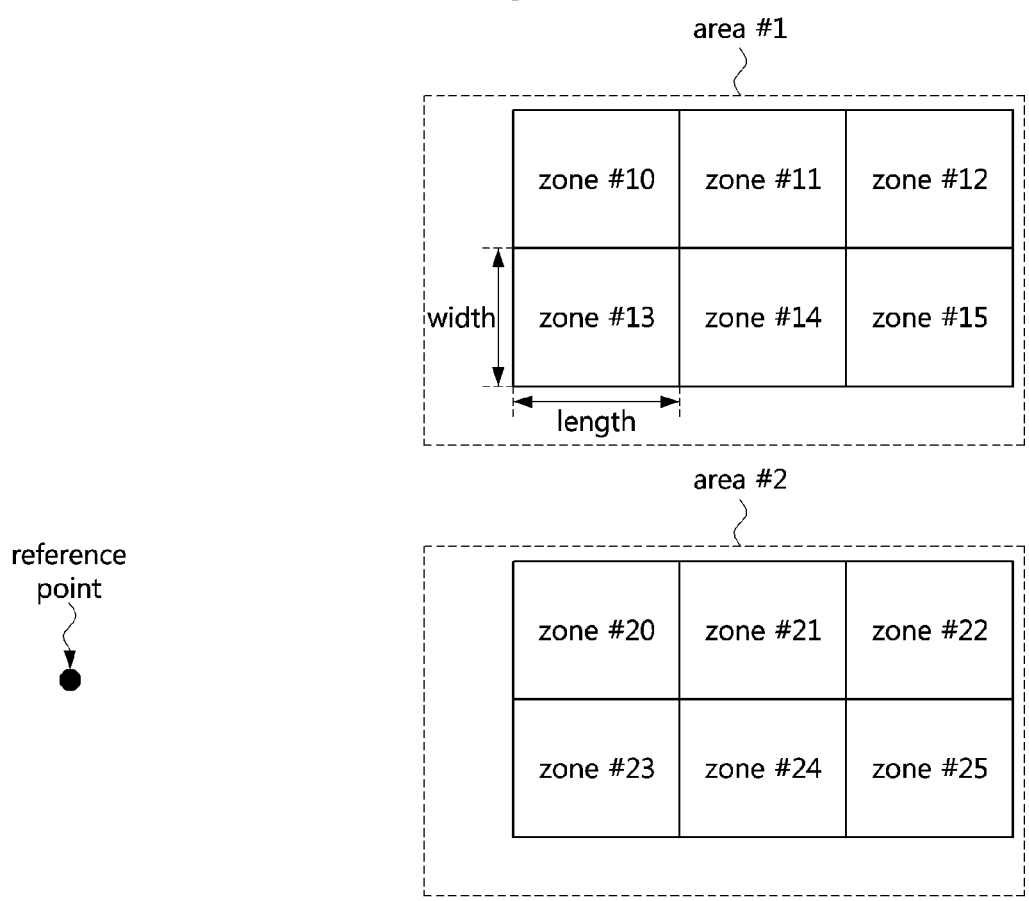
FIG. 7 is a conceptual diagram illustrating a first exemplary embodiment of zones in a cellular communication system.

FIG. 7 is a conceptual diagram illustrating a first exemplary embodiment of zones in a cellular communication system.

As shown in FIG. 7, a plurality of zones may be configured, and a single reference point unique in the world may be configured for the plurality of zones. The reference point may be a fixed point. The geographic coordinate of the reference point may be set to (0, 0). The geographic coordinates of the respective zones may be expressed based on the reference point. An area may consist of one or more zones. For example, an area #1 may include zones #10 to #15, and an area #2 may include zones #20 to #25. Different resources (e.g., different resource pools) may be mapped between adjacent zones. Each of the areas #1 and #2 may be a tracking area (TA) or a validity area. Also, the same system information may be used within one area. The zone may have a length and a width. A zone identifier (ID) may be determined based on a length of the zone, a width of the zone, the number of zones, the reference point, geographic coordinates of a terminal, and the like. The number of zones may include the number of zones located in the first direction (e.g., longitudinal direction) and the number of zones located in the second direction (e.g., width direction). A modulo operation may be performed to determine a zone ID.

When the terminal is located within coverage of a base station, the base station may transmit configuration information of the zones to the terminal. The configuration information of the zones may include the length of the zone, the width of the zone, the number of the zones, and the like. The terminal located outside the coverage of the base station may use predefined configuration information of the zones (e.g., the length of the zone, the width of the zone, the number of zones, and the like) predefined in the technical specification.

Meanwhile, a semi-persistent scheduling (SPS) scheme may be used for transmission of periodic sidelink data in the 4G communication system. In this case, SPS resources may be configured in two stages. A periodicity of the SPS resources in the time domain may be configured by an RRC signaling procedure, and activation or deactivation of the corresponding SPS resources may be indicated by a PHY signaling procedure (e.g., downlink control information (DCI)). Here, the PHY signaling procedure may refer to an L1 signaling procedure. In the 4G communication system, the SPS resources may be used for transmission of periodic sidelink data, and strict latency requirements may not be required.

When the SPS scheme is used, a base station may predict a start timing of a communication service (e.g., transmission timing of data according to the communication service), and may activate SPS resources by using DCI at the predicted start timing. A terminal (e.g., a terminal located in a vehicle) may receive the DCI from the base station, may identify the SPS resources activated by the DCI, and transmit data (e.g., sidelink data) in the identified SPS resources.

Two types of contention-free resource allocation schemes may be used in the 5G communication system. In particular, a configured grant (CG) scheme (e.g., type 2 CG scheme) may be used similarly to the above-described SPS scheme. When the CG scheme is used, CG resources may be configured by an RRC signaling procedure, and activation or deactivation of the CG resources may be indicated by a PHY signaling procedure (e.g., DCI).

The 5G communication system may support periodic services and aperiodic services. Data (e.g., sidelink data) according to a periodic service may be generated periodically, and data (e.g., sidelink data) according to an aperiodic service may be generated aperiodically. The periodic service may be performed using resources (e.g., SPS resources, CG resources) configured by a contention-free resource allocation scheme. However, since the resources configured by the contention-free resource allocation scheme are periodic resources, the aperiodic service may not be performed using the resources configured by the contention-free resource allocation scheme. For example, an occurrence timing (or transmission timing) of aperiodic data may be different from the timing of resources configured by the contention-free resource allocation scheme. In this case, transmission of the aperiodic data may be delayed, and configured resources may be wasted. Here, the periodic data may be data that occurs periodically, and the aperiodic data may be data that occurs aperiodically.

In order to solve the above problems, a contention-free resource allocation scheme capable of supporting aperiodic services may be required. That is, in order to ensure transmission of aperiodic data, the base station may configure a plurality of transmission resource patterns (e.g., a plurality of transmission periodicities), and use an RRC signaling procedure to transmit information of the plurality of transmission resource patterns to a terminal (e.g., a terminal located in a vehicle). The terminal may receive information of the plurality of transmission resource patterns from the base station. The base station may activate or deactivate resources according to the plurality of transmission resource patterns by transmitting control information (e.g., DCI) to the terminal. The terminal may transmit aperiodic data using resources (e.g., sidelink resources) activated by the base station.

Alternatively, when aperiodic data occurs, the terminal may activate or deactivate resources according to the plurality of transmission resource patterns by transmitting control information (e.g., sidelink control information (SCI)) to another terminal, and transmit aperiodic data using activated resources (e.g., sidelink resources). According to the above operations, the above-mentioned problems can be solved.

Meanwhile, in a platooning scenario, terminals located in vehicles participating in groupcast communication may individually request resource allocation from the base station. When the resource allocation requests are received from the terminals, the base station may allocate resources for each of the terminals, and may transmit resource allocation information to each of the terminals. According to the above-described resource allocation scheme, transmission latency may increase, and a lot of overhead may occur in Uu interfaces.

Since the 5G communication system supports unicast communication and groupcast communication as well as broadcast communication, the 5G communication system may have to guarantee higher communication reliability than the 4G communication system. In order to prevent collisions between resources allocated for different services, the base station may coordinate resource configurations for each service type.

In order to solve the above problems, the base station may allocate resources (e.g., dedicated resources for groupcast communication) for vehicles participating in groupcast communication (e.g., groupcast group) in a platooning scenario, and may transmit resource allocation information to a groupcast header. The groupcast header may receive the resource allocation information from the base station, and may activate or deactivate resources indicated by the resource allocation information. That is, the operation of activating or deactivating the resources may be performed by the groupcast header instead of the base station. The groupcast header may be one vehicle (e.g., a terminal located in one vehicle) among the vehicles participating in the groupcast communication, and may control and/or manage the remaining vehicles (e.g., groupcast members) participating in the groupcast communication. According to the above-described operations, the above-mentioned problems (e.g., increase in transmission latency, increase in overhead) can be solved.

Figure 8:
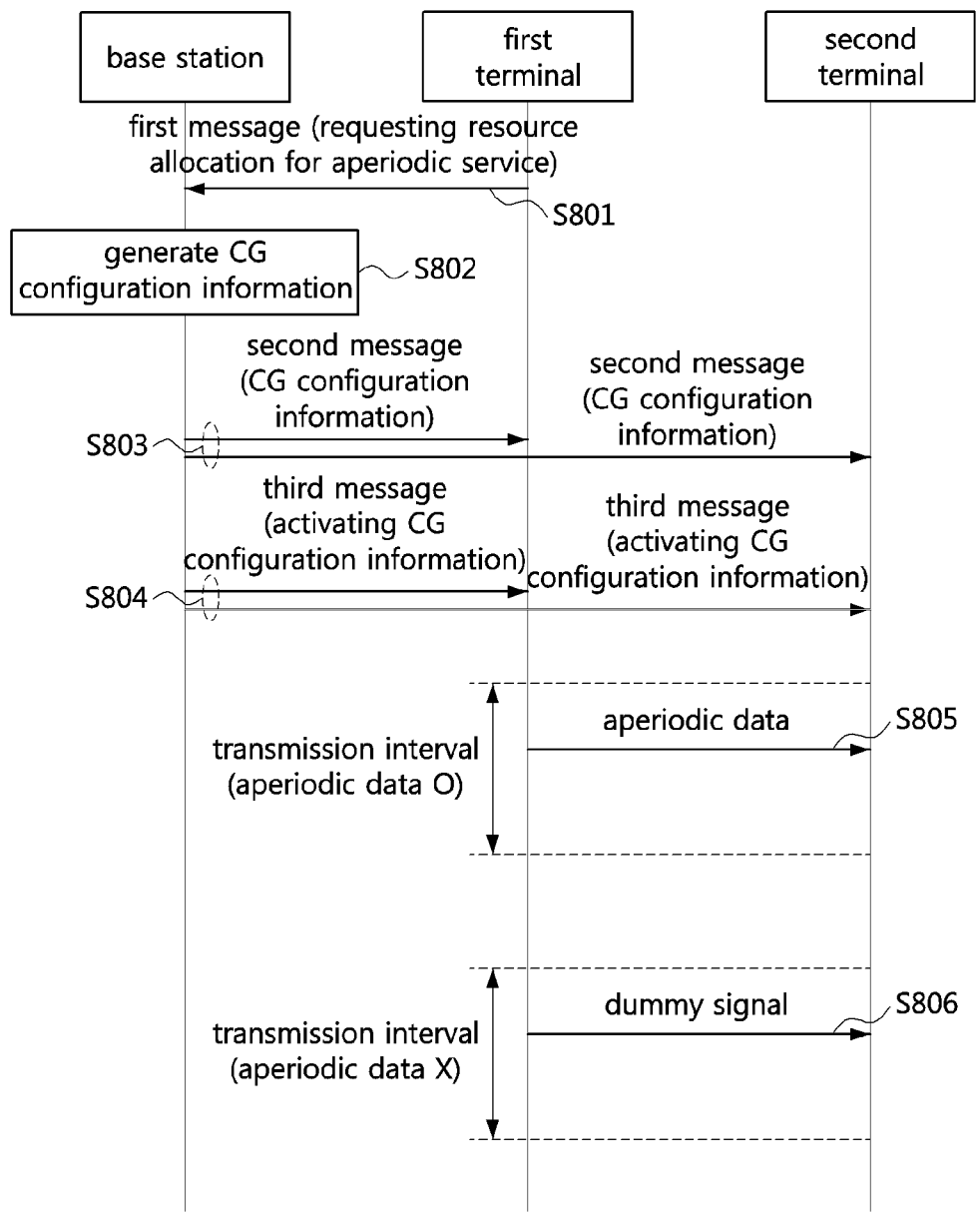
FIG. 8 is a sequence chart illustrating a first exemplary embodiment of a method for transmitting and receiving aperiodic data in sidelink communication.

FIG. 8 is a sequence chart illustrating a first exemplary embodiment of a method for transmitting and receiving aperiodic data in sidelink communication.

As shown in FIG. 8, a communication system may include a base station, a first terminal, and a second terminal. The base station may be the base station 210 shown in FIG. 2. The first terminal may be the UE 235 shown in FIG. 2, and the second terminal may be the UE 236 shown in FIG. 2. Alternatively, the first terminal may be the UE 236 shown in FIG. 2, and the second terminal may be the UE 235 shown in FIG. 2. The base station, the first terminal, and the second terminal may be configured identically or similarly to the communication node 300 shown in FIG. 3. The first terminal and the second terminal may support the protocol stacks shown in FIGS. 4 to 6. The first terminal and the second terminal may be connected to the base station, and may perform sidelink communication based on scheduling of the base station. Alternatively, the first terminal and the second terminal may be located outside coverage of the base station, and may perform sidelink communication without scheduling of the base station.

When it is required to perform an aperiodic service (e.g., aperiodic sidelink service), the first terminal may generate a first message requesting resource allocation for the aperiodic service, and transmit the first message to the base station (S801). The first message may be sidelink UE information, an RRC message, a MAC message (e.g., MAC control element (CE)), and/or a PHY message (e.g., uplink control information (UCI)). The first message may include an indicator for requesting resource allocation for the aperiodic service (e.g., aperiodic data), information indicating the size of the aperiodic data, and information indicating a transmission pattern (e.g., the number of transmissions, transmission timing, transmission periodicity) of the aperiodic data.

The base station may receive the first message from the first terminal, and may determine that resource allocation for the aperiodic service is requested based on information element(s) included in the first message. In this case, the base station may generate CG configuration information including resource allocation information for the aperiodic service (S802). The base station may transmit a second message (e.g., RRC message) including the CG configuration information to the terminal(s) (S803). Alternatively, the CG configuration information may be generated regardless of reception of the first message. For example, the base station may generate the CG configuration information including resource allocation information for the aperiodic service before the step S801. When the first message for requesting resource allocation for the aperiodic service is received from the first terminal, the base station may transmit a second message including the CG configuration information to the terminal(s) (S803). The second message may be transmitted not only to the first terminal but also to other terminal(s) belonging to the coverage of the base station (e.g., the second terminal). Alternatively, the second message may be transmitted only to the first terminal that transmitted the first message.

The CG configuration information may further include information element(s) shown in Tables 3 and 4 below compared to the CG configuration information (e.g., ConfiguredGrantConfig) defined in the existing 3GPP technical specification. An aperiodic service indicator may be referred to as 'AperiodicServiceIndicator'. The information element(s) for the aperiodic service may include a base periodicity, an interim periodicity, aperiodic time domain allocation information, an information indicator, and/or a dummy indicator.

The base periodicity may be referred to as 'base_periodicity', and the interim periodicity may be referred to as 'interim_periodicity'. The aperiodic time domain allocation information may be referred to as 'AperiodicTimeDomainAllocation'. The information indicator may be indicated as 'infoindicator' and may be included in 'CG-SCI-OnPSSCH' of the CG configuration information. The dummy indicator may be indicated as 'dummyindicator' and may be included in 'CG-SCI-OnPSSCH' of the CG configuration information.

TABLE 3

| Information element | Description |
| --- | --- |
| Aperiodic service indicator | The aperiodic service indicator may indicate whether CG configuration information includes information element(s) for aperiodic services (e.g., aperiodic data). The aperiodic service indicator set to '0' may indicate that the CG configuration information does not include information element(s) for aperiodic services. The aperiodic service indicator set to '1' may indicate that the CG configuration information includes information element(s) for aperiodic services. |
| Base periodicity | Base periodicity for aperiodic services. One or more base periodicities may be configured, and a plurality of base periodicities may have the same periodicity or different periodicities. When the plurality of base periodicities have the same periodicity, start timings of the plurality of base periodicities may be different from each other. The base periodicity may be configured in units of symbols, slots, subframes, or radio frames. |
| Interim periodicity | Interim periodicity may be configured to be shorter than the base periodicity. The interim periodicity may be a temporary periodicity. One or more interim periodicities may be configured, and a plurality of interim periodicities may have the same periodicity or different periodicities. When the plurality of interim periodicities have the same periodicity, start timings of the plurality of interim periodicities may be different from each other. The interim periodicity may be configured in units of symbols, slots, subframes, or radio frames. |
| Aperiodic time domain allocation information | Information on time resources according to the base periodicity (e.g., information on a start symbol, length, and/or start and length indicator (SLIV) of a transmission interval according to the base periodicity). The length of the transmission interval may be variable, and may be a length from the start symbol to an end symbol.<br>Information on time resources according to the interim periodicity (e.g., information on a start symbol, length, and/or SLIV of a transmission interval according to the interim periodicity). The length of the transmission interval may be variable, and may be a length from the start symbol to an end symbol.<br>Information on an offset between a plurality of base periodicities<br>Information on an offset between a plurality of interim periodicities<br>Information on an offset between a base periodicity and an interim periodicity |

TABLE 4

| Information element | Description |
|---|---|
| Information indicator | The information indicator may indicate whether SCI scheduling aperiodic data transmission includes information on a next transmission period (e.g., information on a transmission interval in the next transmission period, information on whether aperiodic data is transmitted in the next transmission period). For example, the information indicator set to '0' may indicate that the SCI does not include information on the next transmission period, and the information indicator set to '1' may indicate that the SCI includes information on the next transmission period. |
| Dummy indicator | The dummy indicator may indicate whether a dummy signal or a specific indicator indicating that aperiodic data to be transmitted in the transmission interval does not exist. For example, the dummy indicator set to '0' may indicate that a dummy signal or a specific indicator is not transmitted, and the dummy indicator set to '1' may indicate that a dummy signal or a specific indicator is transmitted. Also, the dummy indicator set to '1' may indicate that the dummy signal or specific indicator is transmitted through SCI scheduling a transmission interval in which the aperiodic data does not exist or the transmission interval (e.g., one or more symbols) in which the aperiodic data does not exist. In this case, the dummy signal or specific indicator may be transmitted through the SCI scheduling the transmission interval in which the aperiodic data does not exist or the transmission interval (e.g., one or more symbols) in which the aperiodic data does not exist. |

The CG configuration information including the information element(s) described in Tables 3 and 4 may be referred to as 'AperiodicConfiguredGrantConfig', and AperiodicConfiguredGrantConfig may include information element(s) described in Tables 5 to 8 below. AperiodicConfiguredGrantConfig may be configured independently of ConfiguredGrantConfig defined in the existing 3GPP technical specification. An index of AperiodicConfiguredGrantConfig may be configured differently from an index of ConfiguredGrantConfig. In this case, a transmission scheme of AperiodicConfiguredGrantConfig may be classified as follows.

Transmission scheme #1: The base station may generate AperiodicConfiguredGrantConfig in the step S802, and may transmit a second message including AperiodicConfiguredGrantConfig in the step S803.

Transmission scheme #2: The base station may generate both ConfiguredGrantConfig and AperiodicConfiguredGrantConfig before the step S801. When the first message is received from the terminal in the step S801, the base station may transmit a second message including AperiodicConfiguredGrantConfig.

Transmission scheme #3: The base station may generate both ConfiguredGrantConfig and AperiodicConfiguredGrantConfig before the step S801, and may transmit both ConfiguredGrantConfig and AperiodicConfiguredGrantConfig before the step S801.

TABLE 5

```
-- ASN1START
-- TAG-CONFIGUREDGRANTCONFIG-START
AperiodicConfiguredGrantConfig ::=        SEQUENCE {
    AperiodicServiceIndicator             ENUMERATED { true },
    frequencyHopping                      ENUMERATED {intraSlot, interSlot}
OPTIONAL,   -- Need S
    cg-DMRS-Configuration                 DMRS-UplinkConfig,
    mcs-Table                             ENUMERATED {qam256, qam64LowSE}
OPTIONAL,   -- Need S
    mcs-TableTransformPrecoder            ENUMERATED {qam256, qam64LowSE}
OPTIONAL,   -- Need S
    uci-OnPUSCH                           SetupRelease { CG-UCI-OnPUSCH }
OPTIONAL,   -- Need M
    resourceAllocation                    ENUMERATED { resourceAllocationType0,
resourceAllocationType1, dynamicSwitch },
    rbg-Size                              ENUMERATED {config2}
OPTIONAL,   -- Need S
    powerControlLoopToUse                 ENUMERATED {n0, n1},
    p0-PUSCH-Alpha                        P0-PUSCH-AlphaSetId,
    transformPrecoder                     ENUMERATED {enabled, disabled}
OPTIONAL,   -- Need S
    nrofHARQ-Processes                    INTEGER(1..16),
    repK                                  ENUMERATED {n1, n2, n4, n8},
    repK-RV                               ENUMERATED {s1-0231, s2-0303, s3-
0000}
OPTIONAL,   -- Need R
    base_periodicity                      ENUMERATED { list of
syms },
    interim_periodicity                   ENUMERATED { list of
syms },
},
```

TABLE 6

```
    configuredGrantTimer              INTEGER (1..64)
OPTIONAL,  -- Need R
      rrc-ConfiguredUplinkGrant       SEQUENCE {
        timeDomainOffset                INTEGER (0..5119),
        AperidctimeDomainAllocation     INTEGER  (0..15),
        frequencyDomainAllocation       BIT STRING (SIZE(18)),
        antennaPort                     INTEGER (0..31),
        dmrs-SeqInitialization          INTEGER (0..1)
OPTIONAL,  -- Need R
        precodingAndNumberOfLayers      INTEGER (0..63),
        srs-ResourceIndicator           INTEGER (0..15)
OPTIONAL,  -- Need R
        mcsAndTBS                       INTEGER (0..31),
        frequencyHoppingOffset           INTEGER   (1..
maxNrofPhysicalResourceBlocks-1)
OPTIONAL,  -- Need R
        pathlossReferenceIndex          INTEGER  (0..maxNrofPUSCH-
PathlossReferenceRSs-1),
        ...,
        [[
        pusch-RepTypeIndicator-r16             ENUMERATED {pusch-
RepTypeA,pusch-RepTypeB}               OPTIONAL,  -- Need
M
        frequency HoppingPUSCH-RepTypeB-r16    ENUMERATED
{interRepetition, interSlot}           OPTIONAL,  -- Cond
RepTypeB
        timeReferenceSFN-r16      ENUMERATED {sfn512}
OPTIONAL  -- Need R
        ]]
      }
OPTIONAL,  -- Need R
      ...,
```

TABLE 7

```
[[
  cg-RetransmissionTimer-r16         INTEGER (1..64)  OPTIONAL,  -- Need R
  cg-minDFI-Delay-r16                INTEGER (1..ffsValue)
OPTIONAL,  -- Need R Upper limit 7 FFS
  cg-nrofPUSCH-InSlot-r16            INTEGER (1..ffsValue)  OPTIONAL,  --
Need R
  cg-nrofSlots-r16                   INTEGER (1..ffsValue) OPTIONAL,  --
Need R
  cg-StartingFullBW-InsideCOT-r16    ENUMERATED {ffs}         OPTIONAL,
-- Need R
  cg-StartingFullBW-OutsideCOT-r16   ENUMERATED {ffs}         OPTIONAL,
-- Need R
  cg-StartingPartialBW-InsideCOT-r16 ENUMERATED {ffs}         OPTIONAL,
-- Need R
  cg-StartingPartialBW-OutsideCOT-r16 ENUMERATED {ffs}        OPTIONAL,
-- Need R
  cg-UCI-Multiplexing                ENUMERATED {enabled}     OPTIONAL,
-- Need R
  cg-COT-SharingOffset-r16           INTEGER (1..ffsValue)  OPTIONAL,  -- Need
R
  betaOffsetCG-UCI-r16               INTEGER (1..ffsValue)    OPTIONAL,  --
Need R
  cg-COT-SharingList-r16             SEQUENCE (SIZE (1..ffsValue)) OF CG-COT-
Sharing-r16
OPTIONAL,  -- Need R
  harq-ProcID-Offset-r16             INTEGER (0..15)  OPTIONAL,  -- Need M
  harq-ProcID-Offset2-r16            INTEGER (0..15)  OPTIONAL,  -- Need M
  configuredGrantConfigIndex-r16              ConfiguredGrantConfigIndex-r16
OPTIONAL,  -- Need M
  configuredGrantConfigIndexMAC-r16           ConfiguredGrantConfigIndexMAC-
r16
OPTIONAL,  -- Need M
  periodicity Ext-r16         INTEGER (1..5120)  OPTIONAL,  -- Need M
  startingFromRV0-r16         ENUMERATED {on, off}     OPTIONAL,  -- Need M
  phy-PriorityIndex-r16       ENUMERATED {p0, p1}      OPTIONAL,  -- Need
M
  autonomousReTx-r16          ENUMERATED {enabled}
OPTIONAL    -- Cond LCH-BasedPrioritization
  ]]
}
```

TABLE 8

```
CG-UCI-OnPUSCH ::= CHOICE {
    dynamic                    SEQUENCE (SIZE (1..4))
                               OF BetaOffsets,
    semiStatic                 BetaOffsets
}
CG-COT-Sharing-r16 ::= SEQUENCE {
    duration-r16               INTEGER (1..ffsValue),
    offset-r16                 INTEGER (1..ffsValue),
    channelAccessPriority-r16  INTEGER (1..4)
}
CG-SCI-OnPSSCH ::= CHOICE {
    infoindicator              ENUMERATED {true}
    dummyindicator             ENUMERATED {true}
}
-- TAG-CONFIGUREDGRANTCONFIG-STOP
-- ASN1STOP
```

Alternatively, the information element(s) listed in Tables 3 and 4 may be included in ConfiguredGrantConfig defined in the existing 3GPP technical specification. In this case, AperiodicConfiguredGrantConfig may not be defined separately. Information element(s) for the aperiodic service included in ConfiguredGrantConfig may be information element(s) described in Table 9 below. That is, in exemplary embodiments, the CG configuration information may include ConfiguredGrantConfig defined in the existing 3GPP technical specification and the information element(s) described in Table 9 below.

TABLE 9

```
AperiodicConfiguredGrantConfig ::=   SEQUENCE{
    AperiodicServiceIndicator        ENUMERATED { true },
    base_periodicity                 ENUMERATED { list of syms },
    interim_periodicity              ENUMERATED { list of syms },
    AperidctimeDomainAllocation      INTEGER (0..15),
}
CG-SCI-OnPSSCH ::= CHOICE {
    infoindicator                    ENUMERATED {true}
    dummyindicator                   ENUMERATED {true}
}
```

On the other hand, the transmission resource pattern (e.g., transmission periodicity) for the aperiodic service may be composed of a combination of the base periodicity(ies) and interim periodicity(ies) included in the CG configuration information (e.g., AperiodicConfiguredGrantConfig). The combination of the base periodicity(ies) and the interim periodicity(ies) may be a transmission resource pattern (e.g., aperiodic sidelink resources) capable of transmitting all aperiodic data. The transmission resource pattern according to a combination of the base periodicity(ies) and the interim periodicity(ies) may be as follows.

Figure 9:
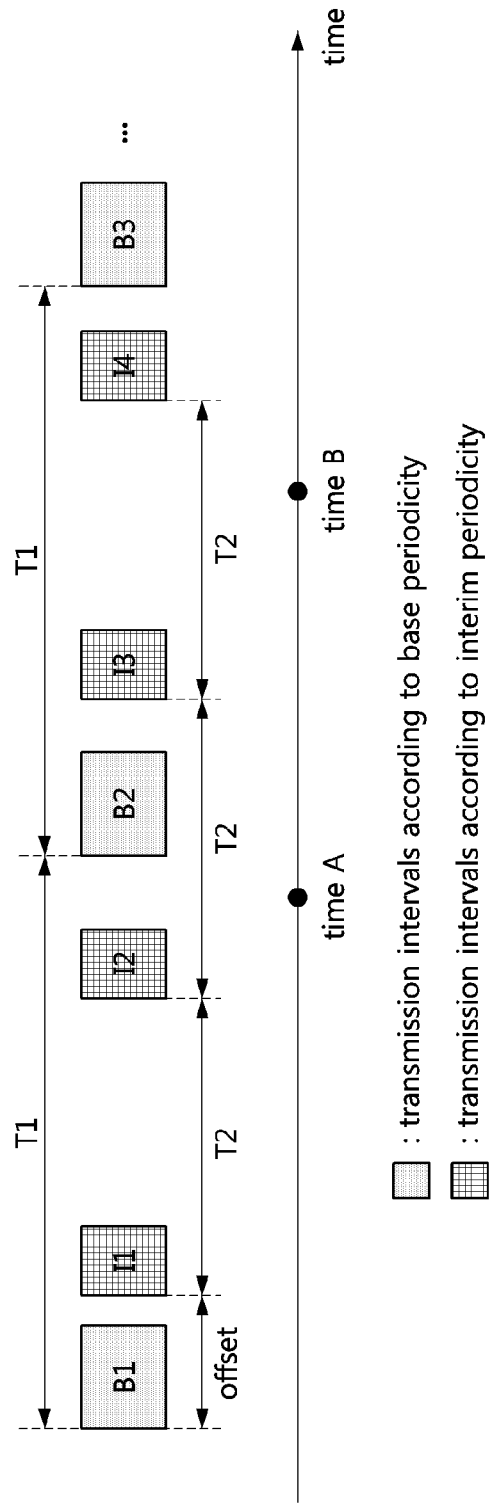
FIG. 9 is a conceptual diagram illustrating a first exemplary embodiment of a transmission resource pattern according to a combination of base periodicity(ies) and interim periodicity(ies) in sidelink communication.

FIG. 9 is a conceptual diagram illustrating a first exemplary embodiment of a transmission resource pattern according to a combination of base periodicity(ies) and interim periodicity(ies) in sidelink communication.

As shown in FIG. 9, the base periodicity may be T1, and the interim periodicity may be T2. T1 may be longer than T2. A start timing (e.g., start symbol) of a first transmission interval B1 according to the base periodicity may be different from a start timing (e.g., start symbol) of a first transmission interval I1 according to the interim periodicity. Information on an offset between the start timing of the first transmission interval B1 according to the base periodicity and the start timing of the first transmission interval I1 according to the interim periodicity may be included in the CG configuration information (e.g., Aperiodic TimeDomainAllocation). In addition, information on the start symbol of the transmission interval, information on the length of the transmission interval, and/or information on an end symbol of the transmission interval may be included in the CG configuration information (e.g., Aperiodic TimeDomainAllocation).

In the aperiodic service, sidelink data may be generated aperiodically. When sidelink data is generated at a time A, the first terminal may transmit the corresponding sidelink data in a transmission interval B2 adjacent to the time A. When sidelink data is generated at a time B, the first terminal may transmit the corresponding sidelink data in a transmission interval I4 adjacent to the time B.

Meanwhile, as another method, a bitmap may be used instead of the base periodicity(ies) and the interim periodicity(ies). That is, the bitmap may indicate a transmission resource pattern (e.g., aperiodic sidelink resources) capable of transmitting all aperiodic data. In this case, the CG configuration information may include information element(s) described in Table 10 below instead of the base periodicity(ies), interim periodicity(ies), and/or aperiodic time domain allocation information. Alternatively, the information element(s) listed in Table 10 below may be transmitted through a separate RRC message instead of ConfiguredGrantConfig.

TABLE 10

```
BitmapConfig ::= SEQUENCE {
    BitmapSize   ENUMERATED {sym1x14, sym2x14, sym4x14,
sym5x14, sym8x14, sym10x14, sym16x14, sym20x14, ... },
    BitmapApply  ENUMERATED {sfn},
    Bitmap       BIT STRING (BitmapSize)
}
```

BitmapSize may indicate the size of the bitmap. The size of the bitmap may be set in units of symbols, mini-slots, slots, or subframes. BitmapApply may indicate a timing when the bitmap is applied. For example, the bitmap may be applied from a first symbol of a system frame according to a system frame number (SFN) indicated by BitmapApply. Bitmap may be the bitmap indicating the transmission resource pattern (e.g., aperiodic sidelink resources) capable of transmitting aperiodic data. For example, a bit set to '0' in the bitmap may indicate that a symbol corresponding to the bit is not used for aperiodic data transmission. A bit set to '1' in the bitmap may indicate that a symbol corresponding to the bit is used for aperiodic data transmission. The transmission resource pattern indicated by the bitmap may be as follows.

Figure 10:
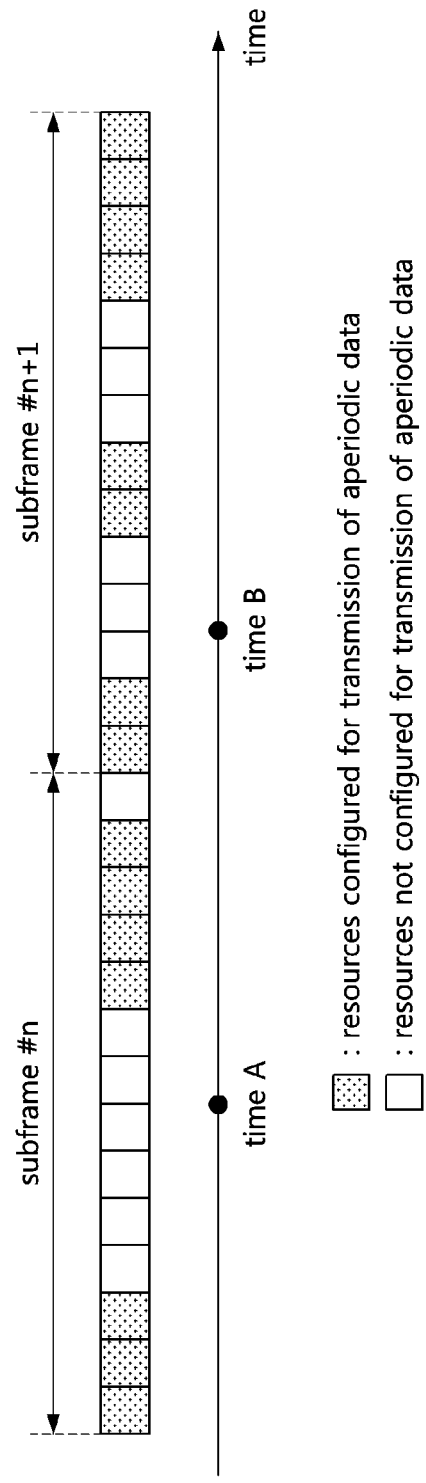
FIG. 10 is a conceptual diagram illustrating a first exemplary embodiment of a transmission resource pattern according to a bitmap in sidelink communication.

FIG. 10 is a conceptual diagram illustrating a first exemplary embodiment of a transmission resource pattern according to a bitmap in sidelink communication. As shown in FIG. 10, a bitmap may be configured in units of symbols, the size of the bitmap may be sym2 x14 (i.e., 28 bits), and one subframe may include 14 symbols (e.g., symbols #0 to #13). For example, the bitmap may be set to '1110000 0011110 1100011 0001111'. The terminal(s) (e.g., the first terminal and/or the second terminal) may identify the bitmap based on the information element(s) included in the CG configuration information, and based on the bitmap, may identify the resource(s) capable of transmitting aperiodic data.

In the aperiodic service, sidelink data may be generated aperiodically. When sidelink data is generated at a time A, the first terminal may transmit the corresponding sidelink data from a symbol #9 in a subframe #n adjacent to the time A. When sidelink data is generated at a time B, the first terminal may transmit the corresponding sidelink data from a symbol #5 in a subframe #n+1 adjacent to the time B.

Referring again to FIG. 8, the terminal(s) (e.g., the first terminal and/or the second terminal) may receive the second message from the base station, and may identify the CG configuration information (e.g., AperiodicConfiguredGrantConfig) included in the second message. The base station may generate a third message (e.g., RRC message, MAC message, and/or PHY message) indicating activation of the CG configuration information, and may transmit the third message to the terminal(s) (S804). The third message may include an index of AperiodicConfiguredGrantConfig. When the third message is received from the base station, the terminal(s) may determine that the CG configuration information is activated. Alternatively, the step S804 may be omitted. In this case, when the CG configuration information is received from the base station, the terminal(s) may determine that the use of the CG configuration information is permitted.

The first terminal may perform sidelink communication with the second terminal by using the resources configured by the CG configuration information (e.g., resources according to the base periodicity(ies) and/or interim periodicity(ies) or resources according to the bitmap). When sidelink data (e.g., aperiodic data) is generated, the first terminal may transmit the sidelink data to the second terminal in a transmission interval according to the CG configuration information (S805). The second terminal may receive the sidelink data by performing a monitoring operation in the transmission interval according to the CG configuration information. The step S805 may be performed without scheduling by SCI.

Alternatively, the step S805 may be performed according to scheduling by SCI. For example, when sidelink data is generated, the first terminal may generate SCI including scheduling information of the corresponding sidelink data, and may transmit the SCI to the second terminal. The SCI may be transmitted in the transmission interval according to the CG configuration information or before the transmission interval. The second terminal may receive the SCI from the first terminal, and may receive the sidelink data from the first terminal based on the scheduling information included in the SCI. In addition, the SCI may include information of a next transmission period. For example, when the information indicator included in the CG configuration information is set to '1', the first terminal may transmit the SCI including the information of the next transmission period. The information of the next transmission period may include information on a transmission interval (e.g., start timing, length, and/or end timing of the transmission interval) in the next transmission period, information indicating whether aperiodic data is transmitted in the next transmission period, and the like. Accordingly, the second terminal receiving the SCI may identify not only the scheduling information but also the information of the next transmission period.

On the other hand, there may be no sidelink data to be transmitted in the transmission interval according to the CG configuration information. In this case, the first terminal may notify other terminal(s) that the corresponding transmission interval is not used by transmitting a dummy signal (or, specific indicator) (S806). For example, when the dummy indicator included in the CG configuration information is set to '1', the first terminal may transmit a dummy signal (or, specific indicator). The dummy signal (or, specific indicator) may be transmitted in the transmission interval in which sidelink data to be transmitted does not exist or in a transmission region of SCI for transmission scheduling in the corresponding transmission interval. When the dummy signal (or, specific indicator) is received from the first terminal, the second terminal may determine that the first terminal does not transmit sidelink data in the transmission interval associated with the dummy signal (or specific indicator), and may perform sidelink communication in the corresponding transmission interval.

Figure 11A:
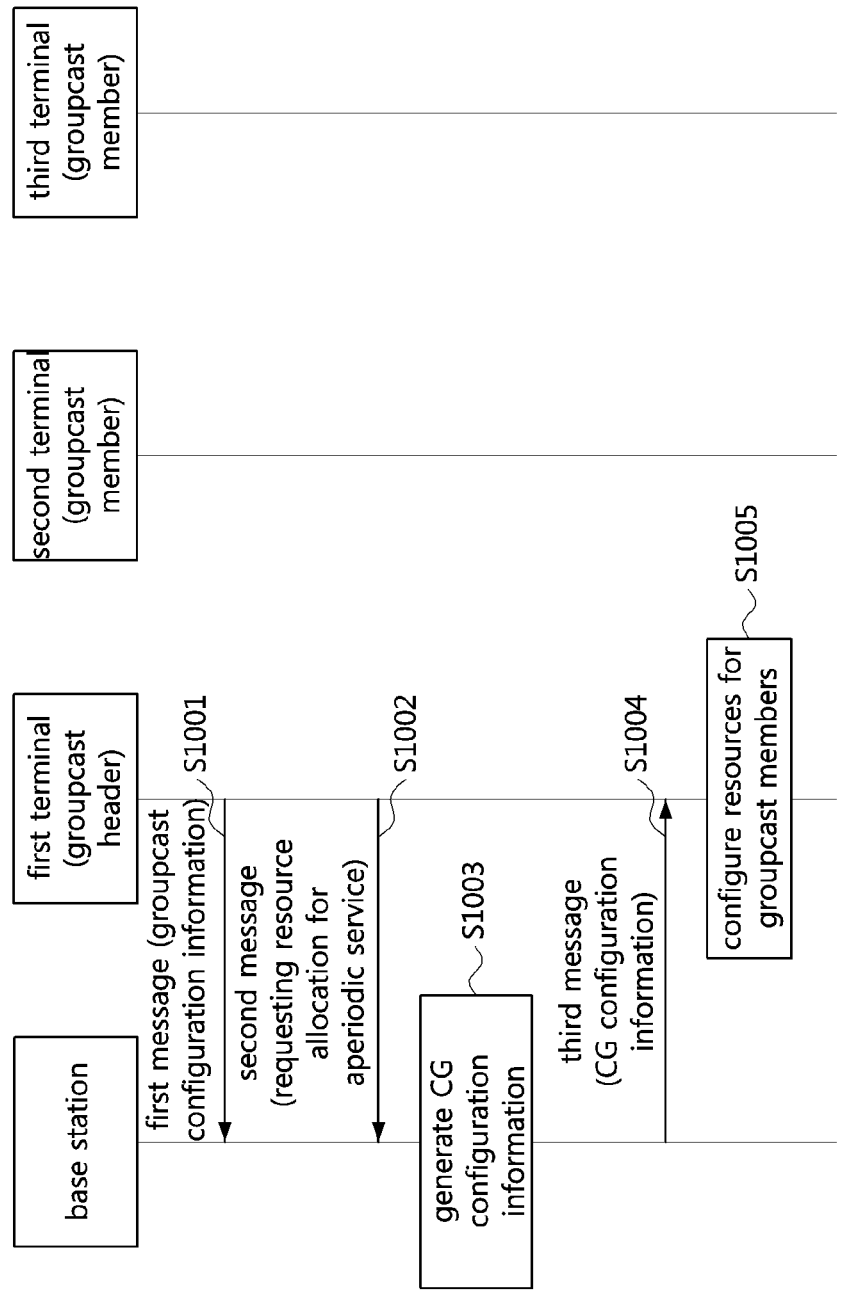
FIGS. 11A and 11B are sequence charts illustrating a second exemplary embodiment of a method for transmitting and receiving aperiodic data in sidelink communication.
Figure 11B:
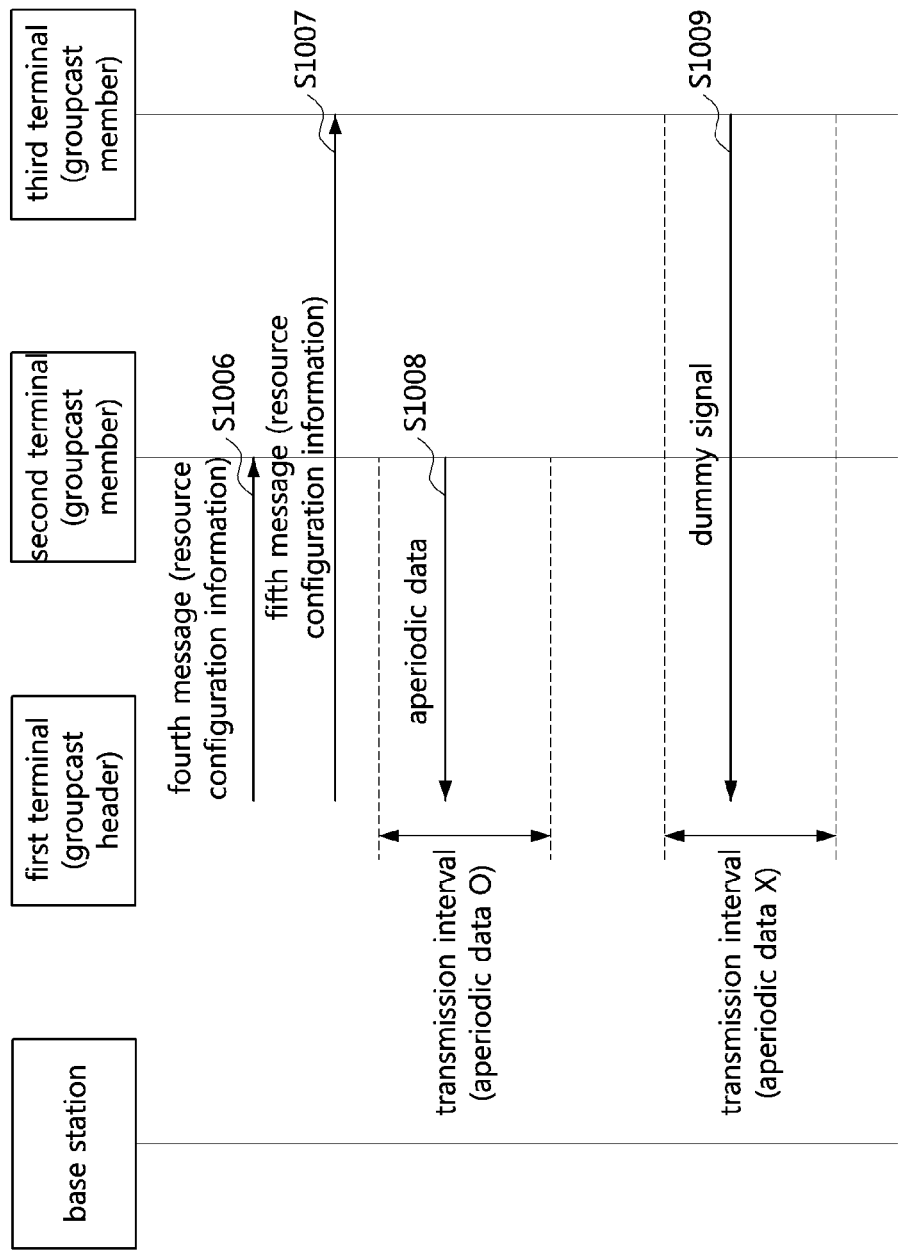

FIGS. 11A and 11B are sequence charts illustrating a second exemplary embodiment of a method for transmitting and receiving aperiodic data in sidelink communication.

As shown in FIGS. 11A and 11B, a communication system may include a base station, a first terminal, a second terminal, and a third terminal. The base station may be the base station 210 shown in FIG. 2. Each of the first terminal, the second terminal, and the third terminal may be the UE 235 or UE 236 shown in FIG. 2. The base station, the first terminal, the second terminal, and the third terminal may be configured identically or similarly to the communication node 300 shown in FIG. 3. The first terminal, the second terminal, and the third terminal may support the protocol stacks shown in FIGS. 4 to 6. The first terminal, the second terminal, and the third terminal may be connected to the base station, and may perform sidelink communication based on scheduling of the base station. Alternatively, the first terminal, the second terminal, and the third terminal may be located outside coverage of the base station, and may perform sidelink communication without scheduling of the base station.

Each of the first terminal, the second terminal, and the third terminal may be located in a vehicle participating in platooning. In the platoon driving scenario, sidelink communication may be performed in a groupcast scheme. Terminals participating in groupcast communication (e.g., groupcast group) may be classified into a groupcast header and groupcast member(s). The groupcast header may control and/or manage operations of the groupcast member(s). The first terminal may be the groupcast header, and the remaining terminals (e.g., the second terminal and the third terminal) may be the groupcast members.

In the platooning scenario, the first terminal operating as the groupcast header may transmit a first message including groupcast configuration information to the base station (S1001). The first message may include information indicating that the first terminal operates as the groupcast header (e.g., an identifier of the first terminal that operates as the groupcast header), information indicating that the second terminal and the third terminal operate as groupcast members (e.g., identifiers of the second terminal and the third terminal operating as groupcast members), and/or the like. The base station may receive the first message from the first terminal, and may identify the groupcast configuration information included in the first message. That is, the base station may determine that the first to third terminals participate in groupcast communication, may determine that the first terminal operates as the groupcast header, and may determine that the second terminal and the third terminal operate as the groupcast members.

When it is required to perform an aperiodic service (e.g., aperiodic sidelink service), the first terminal may generate a second message requesting resource allocation for the aperiodic service, and transmit the second message to the base station (S1002). The second message may be sidelink UE information, an RRC message, a MAC message, and/or a PHY message. The second message may include an indicator for requesting resource allocation for the aperiodic service (e.g., aperiodic data), information indicating the size of the aperiodic data, and information indicating a transmission pattern (e.g., the number of transmissions, transmission timing, transmission periodicity) of the aperiodic data.

The base station may receive the second message from the first terminal, and may determine that resource allocation for the aperiodic service is requested based on the information element(s) included in the second message. In this case, the base station may generate CG configuration information including resource allocation information for the aperiodic service (S1003). The base station may transmit a third message (e.g., RRC message) including the CG configuration information to the terminal(s) (S1004). Alternatively, the CG configuration information may be generated regardless of reception of the second message. For example, the base station may generate the CG configuration information including resource allocation information for the aperiodic service before the step S1002. When the second message for requesting resource allocation for the aperiodic service is received from the first terminal, the base station may transmit a third message including the CG configuration information to the first terminal (S1004). The third message may be transmitted to the groupcast header among the terminals participating in the groupcast communication.

The CG configuration information may further include the information element(s) described in Tables 3 and 4 described above compared to the CG configuration information (e.g., ConfiguredGrantConfig) defined in the existing 3GPP technical specification. In addition, the CG configuration information may further include a grant indicator (e.g., GrantIndicator) that allows the groupcast header to activate, deactivate, change, and/or release the resource(s) indicated by the CG configuration information for the groupcast member(s). The groupcast header receiving the grant indicator may activate, deactivate, change, and/or release the resource(s) for the groupcast terminal(s) without control of the base station.

The CG configuration information including the information element(s) described in Tables 3 and 4 may be referred to as 'AperiodicConfiguredGrantConfig', and AperiodicConfiguredGrantConfig may include the information element(s) described in Tables 5 to 8 described above. AperiodicConfiguredGrantConfig may be configured independently of ConfiguredGrantConfig defined in the existing 3GPP technical specification. An index of AperiodicConfiguredGrantConfig may be set differently from an index of ConfiguredGrantConfig. In this case, a transmission scheme of AperiodicConfiguredGrantConfig may be classified as follows.

Transmission scheme #1: The base station may generate AperiodicConfiguredGrantConfig in the step S1003, and may transmit the third message including AperiodicConfiguredGrantConfig in the step S1004.

Transmission scheme #2: The base station may generate both ConfiguredGrantConfig and AperiodicConfiguredGrantConfig before the step S1002. When the second message is received from the terminal in the step S1002, the base station may transmit the third message including AperiodicConfiguredGrantConfig.

Transmission scheme #3: The base station may generate both ConfiguredGrantConfig and AperiodicConfiguredGrantConfig before the step S1002, and may transmit both ConfiguredGrantConfig and AperiodicConfiguredGrantConfig before the step S1002.

Alternatively, the information element(s) listed in Tables 3 and 4 may be included in ConfiguredGrantConfig defined in the existing 3GPP technical specification. In this case, AperiodicConfiguredGrantConfig may not be defined separately. Information element(s) for the aperiodic service included in ConfiguredGrantConfig may be information element(s) described in Table 9 above. That is, in exemplary embodiments, the CG configuration information may include ConfiguredGrantConfig defined in the existing 3GPP technical specification and the information element(s) described in Table 9 above.

Meanwhile, as another method, a bitmap may be used instead of the base periodicity(ies) and the interim periodicity(ies). That is, the bitmap may indicate a transmission resource pattern (e.g., aperiodic sidelink resources) capable of transmitting all aperiodic data. In this case, the CG configuration information may include the information element(s) described in Table 10 above instead of the base periodicity(ies), interim periodicity(ies), and/or aperiodic time domain allocation information. Alternatively, the information element(s) listed in Table 10 above may be transmitted through a separate RRC message instead of ConfiguredGrantConfig.

The first terminal may receive the third message from the base station and may identify the CG configuration information (e.g., AperiodicConfiguredGrantConfig) included in the third message. When the CG configuration information includes the grant indicator, the first terminal may configure the resource(s) indicated by the CG configuration information for the groupcast members (e.g., the second terminal and the third terminal) (S1005). In this case, the first terminal may configure resources for the groupcast members in consideration of the number of groupcast members participating in groupcast communication, the size of aperiodic data to be transmitted by each of the groupcast members, and/or a transmission pattern (e.g., number of transmissions, transmission timing, transmission periodicity).

The first terminal may generate a fourth message including information on resource(s) configured for the second terminal. The fourth message may further include information element(s) (e.g., information indicator and/or dummy indicator) listed in Table 4 above. The first terminal may transmit the fourth message to the second terminal (S1006). The fourth message may be a message indicating activation of the resource(s). The second terminal may receive the fourth message from the first terminal, and may identify the information element(s) (e.g., resource configuration information, information indicator, and/or dummy indicator) included in the fourth message.

In addition, the first terminal may generate a fifth message including information on resource(s) configured for the third terminal. The fifth message may further include information element(s) (e.g., information indicator and/or dummy indicator) listed in Table 4 above. The first terminal may transmit the fifth message to the third terminal (S1007). The fifth message may be a message indicating activation of the resource(s). The third terminal may receive the fifth message from the first terminal, and may identify the information element(s) (e.g., resource configuration information, information indicator, and/or dummy indicator) included in the fifth message.

The second terminal and the third terminal may perform sidelink communication with the first terminal by using the resources configured by the CG configuration information (e.g., resources according to the base periodicity(ies) and/or interim periodicity(ies) or resources according to the bitmap). For example, when sidelink data (e.g., aperiodic data) is generated, the second terminal may transmit the sidelink data to the first terminal in a transmission interval according to the CG configuration information (S1008). The first terminal may receive the sidelink data by performing a monitoring operation in the transmission interval according to the CG configuration information. The step S1008 may be performed without scheduling by SCI.

Alternatively, the step S1008 may be performed according to scheduling by SCI. For example, when sidelink data is generated, the second terminal may generate SCI including scheduling information of the corresponding sidelink data, and may transmit the SCI to the first terminal. The SCI may be transmitted in the transmission interval according to the CG configuration information or before the transmission interval. The first terminal may receive the SCI from the second terminal, and may receive the sidelink data from the second terminal based on the scheduling information included in the SCI. In addition, the SCI may include information of a next transmission period. For example, when the information indicator included in the CG configuration information is set to '1', the second terminal may transmit the SCI including information of the next transmission period. The information of the next transmission period may include information on a transmission interval (e.g., start timing, length, and/or end timing of the transmission interval) in the next transmission period, information indicating whether aperiodic data is transmitted in the next transmission period, and the like. Accordingly, the first terminal receiving the SCI may identify not only the scheduling information but also the information of the next transmission period.

On the other hand, there may be no sidelink data to be transmitted in the transmission interval according to the CG configuration information. In this case, the second terminal may notify other terminal(s) that the corresponding transmission interval is not used by transmitting a dummy signal (or, specific indicator) (S1009). For example, when the dummy indicator included in the CG configuration information is set to '1', the third terminal may transmit a dummy signal (or, specific indicator). The dummy signal (or, specific indicator) may be transmitted in the transmission interval in which sidelink data to be transmitted does not exist or in a transmission region of SCI for transmission scheduling in the corresponding transmission interval. When the dummy signal (or, specific indicator) is received from the third terminal, other terminal(s) may determine that the third terminal does not transmit sidelink data in the transmission interval associated with the dummy signal (or specific indicator), and may perform sidelink communication in the corresponding transmission interval.

In addition, when sidelink data (e.g., aperiodic data) is generated, the first terminal may transmit the sidelink data to the second terminal and/or the third terminal in the transmission interval according to the CG configuration information. The second terminal and/or the third terminal may receive the sidelink data by performing a monitoring operation in the transmission interval according to the CG configuration information. Alternatively, the sidelink communication may be performed according to scheduling by SCI. For example, when sidelink data is generated, the first terminal may generate SCI including scheduling information of the corresponding sidelink data, and may transmit the SCI to the second terminal and/or the third terminal.

The SCI may be transmitted in the transmission interval according to the CG configuration information or before the transmission interval. The second terminal and/or the third terminal may receive the SCI from the first terminal, and may receive the sidelink data from the first terminal based on the scheduling information included in the SCI. In addition, the SCI may include information of the next transmission period. For example, when the information indicator included in the CG configuration information is set to '1', the first terminal may transmit the SCI including information of the next transmission period. The information of the next transmission period may include information on a transmission interval (e.g., start timing, length, and/or end timing of the transmission interval) in the next transmission period, information indicating whether aperiodic data is transmitted in the next transmission period, and/or the like. Accordingly, the second terminal and/or the third terminal receiving the SCI may identify not only the scheduling information but also the information of the next transmission period.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for operating a first terminal in sidelink communication, the method comprising:
   receiving, from a base station, first configured grant (CG) configuration information including first resource allocation information indicating sidelink resources;
   identifying the sidelink resources indicated by the first resource allocation information; and
   transmitting data to a second terminal in the sidelink resources,
   wherein the first resource allocation information includes information on a first transmission periodicity and information on a second transmission periodicity,
   wherein the first transmission periodicity is different from the second transmission periodicity, and
   wherein the sidelink resources are indicated by at least one of the first transmission periodicity or the second transmission periodicity.

2. The method according to claim 1, further comprising:
   receiving, from the base station, an activation message indicating activation of the first CG configuration information.

3. The method according to claim 1, wherein the first resource allocation information includes a bitmap indicating the sidelink resources.

4. The method according to claim 1, wherein the transmission of the data is scheduled by sidelink control information (SCI).

5. The method according to claim 1, wherein when the sidelink communication is performed in a groupcast scheme, the first terminal among terminals participating in groupcast communication is a groupcast header, and remaining terminals including the second terminal are groupcast members, and further comprising:

configuring groupcast sidelink resources for each of the groupcast members within the sidelink resources indicated by the first resource allocation information; and transmitting information of the groupcast sidelink resources to each of the groupcast members.

6. The method of claim 1, further comprising:

transmitting, to the base station, a request message requesting allocation of the sidelink resources for aperiodic data.

7. The method of claim 6, wherein the first CG configuration information is configured independently of second CG configuration information including second resource allocation information for transmission of periodic data.

8. The method of claim 6, wherein the request message includes at least one of an indicator requesting allocation of the sidelink resources for the aperiodic data, information indicating a size of the aperiodic data, information on a transmission pattern of the aperiodic data, or combinations thereof.

9. The method of claim 1, wherein the first resource allocation information further includes information on locations of the sidelink resources in a time domain.

10. A method for operating a base station in a communication system, the method comprising:

generating first configured grant (CG) configuration information including first resource allocation information indicating sidelink resources;

generating second CG configuration information including second resource allocation information indicating periodic sidelink resources;

transmitting, to a terminal, a first message including the first CG configuration information and the second CG configuration information; and transmitting, to the terminal, a second message requesting activation of the first CG configuration information.

11. The method according to claim 10, wherein the first CG configuration information is generated when a request message requesting allocation of aperiodic sidelink resources is received from the terminal.

12. The method according to claim 10, wherein the first resource allocation information includes information on a first transmission periodicity and information on a second transmission periodicity, wherein the first transmission periodicity is different from the second transmission periodicity, and wherein the aperiodic sidelink resources are indicated by at least one of the first transmission periodicity or the second transmission periodicity.

13. The method according to claim 10, wherein the first resource allocation information includes a bitmap indicating the aperiodic sidelink resources.

14. The method according to claim 10, wherein the first CG configuration information further includes at least one of an information indicator indicating whether sidelink control information (SCI) for scheduling transmission of the aperiodic data includes information of a next transmission period, or a dummy indicator indicating whether a dummy signal is transmitted when the aperiodic data does not exist.

15. The method according to claim 10, wherein the first CG configuration information further includes a grant indicator indicating that the terminal is allowed to activate or deactivate the aperiodic sidelink resources without control of the base station.

16. The method according to claim 10, wherein the first message is a radio resource control (RRC) message, and the second message is a physical (PHY) layer message.

17. A first terminal in sidelink communication, the first terminal comprising:

a processor; and a memory storing one or more instructions executable by the processor, wherein the one or more instructions cause the first terminal to:

receive, from a base station, configured grant (CG) configuration information including information of a first transmission periodicity and information of a second transmission periodicity;

identify sidelink resources indicated by at least one of the first transmission periodicity or the second transmission periodicity; and transmit the sidelink data to a second terminal in the sidelink resources, wherein the first transmission periodicity is different from the second transmission periodicity.

18. The first terminal according to claim 17, wherein the one or more instructions further cause the first terminal to transmit a request message requesting allocation of the sidelink resources to the base station, and wherein the CG configuration information is received after transmitting the request message.

19. The first terminal according to claim 17, wherein the one or more instructions further cause the first terminal to; receive, from the base station, an activation message indicating activation of the CG configuration information.

20. The first terminal according to claim 17, wherein the sidelink data is scheduled by sidelink control information (SCI), and wherein the SCI includes at least one of information on a second transmission interval after the first transmission interval, information indicating whether the sidelink data is transmitted in the second transmission interval, or a combination thereof.

* * * * *